United States Patent

[11] 3,577,069

[72] Inventors Leon Malnar;
Henri Brun, Paris, France
[21] Appl. No. 796,355
[22] Filed Feb. 3, 1969
[45] Patented May 4, 1971
[73] Assignee CSF Compagnie Generale De Telegraphie Sans Fil
[32] Priority Feb. 5, 1968
[33] France
[31] 138,698

[54] OPTICAL RESONANCE CELLS CONTAINING AN ALLOY OF AN ALKALI METAL WITH ANOTHER METAL
11 Claims, 3 Drawing Figs.

[52] U.S. Cl. ..................................................... 324/0.5, 331/94

[51] Int. Cl. ..................................................... G01r 33/08
[50] Field of Search ........................................... 324/0.5
(Lit); 331/3, 94, (Inquired)

[56] References Cited
UNITED STATES PATENTS
3,422,344   1/1969   Malnar ........................ 324/0.5

Primary Examiner—Michael J. Lynch
Attorney—Cushman, Darby & Cushman

ABSTRACT: An optical resonance cell containing an alkali vapor to be optically pumped and comprising a bulb communicating with the cell. An alloy of the alkali metal with another metal is placed in the bulb. This metal is so selected that the atoms of its vapor produce a disturbance as small as possible of the spin function of the alkali atoms, by spin exchange collisions.

PATENTED MAY 4 1971      3,577,069

OPTICAL RESONANCE CELLS CONTAINING AN ALLOY OF AN ALKALI METAL WITH ANOTHER METAL

The present invention relates to optical resonance cells, as used, for example, in atomic clocks, optically pumped magnetometers, or other devices.

Cells which are available at the present time can operate only at very low optimum temperatures. In other words, these cells can operate only with an optimum saturation vapor density; if this density is too low in the cell, too few atoms are involved in the phenomena of optical pumping and resonance, and the resonance signal disappears. Conversely, if the vapor density is too high, the resonance signal is too weak, because of a variety of phenomena, for example because of too high a degree of absorption of the pumping light, due to the fact that optical absorption becomes very substantial above a certain vapor density, or because of a significant relaxation effect developing due to a considerable increase in the number of collisions between vapor atoms.

The optimum temperature of operation of a resonance cell is thus around 35° C for example for cesium vapor and around 45° C. for rubidium vapor. The adjustment of the temperature of cells of this kind, at ambient temperatures which may be higher, requires the use of thermoelectric elements (such as "frigatrons") which require a substantial power.

One solution has been considered with a view to avoiding the use of such elements. A compound of carbon and alkali metal has been used, making it possible to achieve an appropriate alkaline vapor pressure by heating this compound to a temperature in the order of 250° C. or more. However, this approach is open to the drawback that it is necessary to heat part of the resonance cell to 250° C, and this may be a drawback, where the stability of the system, in which the cell is included, is concerned, in particular in the case of clocks where there is a density gradient in the filler gas, the variation in which unfavorably affect the stability of the clock frequency.

It is an object of this invention to avoid such drawbacks by providing a resonance cell, the temperature control of which is simple to effect in all normal conditions of operation, this without excessive power consumption and due to the achievement of a relatively high optimum temperature of operation which is easily adjustable at the time of manufacture of the cell.

According to the invention there is provided an optical resonance cell containing an alkali metal vapor to be optically pumped, comprising a transparent envelope and, in said envelope, a reserve of an alloy of said alkali metal with another metal.

For a better understanding of the invention and to show how the same may be carried into effect, reference will be made to the drawing accompanying the following description and in which.

Figure 1:
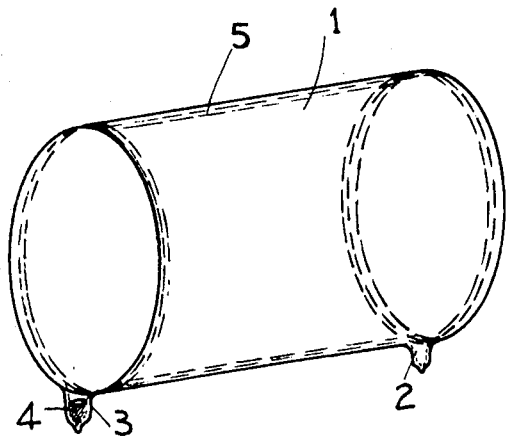
FIG. 1 is an embodiment of the cell according to the invention.

In FIG. 1, an embodiment of the cell according to the invention has been illustrated. As in known cells, this embodiment comprises a glass envelope 1, containing the vapor of an alkali metal which is to be optically pumped, an exhaust stem 2 and a bulb 3 communicating with the envelope 1 and serving as a container. The envelope illustrated has a cylindrical shape but envelopes having any other shape, for example spherical may also be used. The internal wall of the envelope is coated with a thin layer 5 of paraffin which, as those skilled in the art will be aware, makes it possible to prevent any disorientation of the vapor atoms as a consequence of direct collision with the glass of the wall.

In accordance with the invention, the bulb 3 contains a reserve 4 of an alloy of the alkali metal with another metal. As a consequence, the alkali metal vapors at a given temperature, within the envelope 1 is low in relation to that which would otherwise be obtained if the reserve 4 were constituted by alkali metal alone.

With this alloy, the requisite vapor pressure for satisfactory operation of the cell is obtained at a temperature which is higher than if the alkali element were employed alone.

In the case of atomic clocks, the optical pumping of the alkaline vapor contained in the resonance cell is an operation calling for a high precision. The vapor pressure of the metal alloyed with the alkali metal, can, if it is too high, produce a reduction in efficiency of the optical pumping. In order to avoid any disturbance of the relative orientation of the electronic and nuclear spin of the alkali atoms, as a consequence of collisions with the atoms of the alloying metal, it is proposed in accordance with the invention that the alloying metal should be an element which cannot, by collision, disturb the spin function of the alkali atoms whose resonance line is being detected.

By way of a nonlimitative example, it is possible to alloy with an alkali metal such as rubidium, an element whose atom does not have any resultant electron spin, such as mercury, for example.

In the case where the alloying metal does not satisfy the aforementioned condition, the invention provides for the use of an alloying metal whose vapor pressure and effective cross section of spin exchange collisions with respect to the alkali atoms are such that their product is lower than the product of the effective cross section of spin exchange collisions of the alkali atoms with respect to one another and the vapor pressure of the alkali metal; this makes it possible to reduce the importance of spin exchange collisions.

A metal such as gold satisfies these requirements. However, a cell containing for example an alloy of gold and rubidium cannot operate at a temperature below 150° C, this being much too high for conventional applications of the cells in question. This is due to the fact that gold and rubidium are not miscible in just any proportion, and that it is not possible to obtain an alloy which will have the requisite proportions for operation at the desired temperature of say 70° C.

Thus, in order to be able to regulate readily the proportions of the alloy, the invention provides, besides, for the use as alloying metal of a metal having an atomic radius $r_M$ which is linked to the atomic radius $r_A$ of the alkali used, by the relationship:

$$0.93 \leq \frac{r_A}{r_M} \leq 1.07$$

Denver CO alkali such as caesium, rubidium and potassium, satisfy this condition very well.

Figure 2:
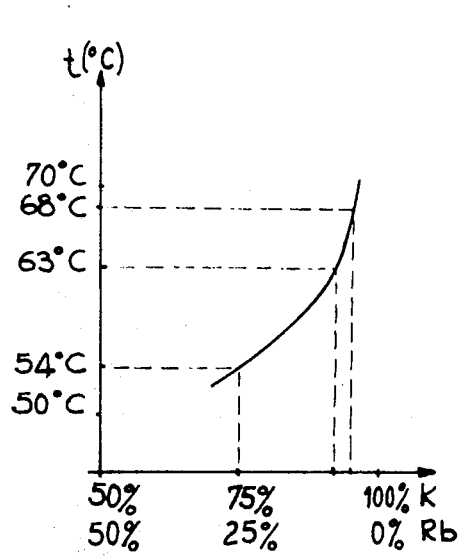
FIG. 2 illustrates variations in the optimum temperature of operation of the cell, as a function of the alloy used.

By way of example, for an atomic clock using rubidium vapor, FIG. 2 illustrates variations in the optimum temperature of operation of the cell (the cell wall being coated with paraffin) as a function of the proportions, in the alloy used, of rubidium and potassium, the latter metal satisfying the requisite conditions very well, vis-a-vis rubidium, namely low vapor pressure and miscibility in any proportion. A temperature of operation of 68° C. was obtained for an alloy containing 2 mg. of rubidium and 40 mg. of potassium, or 95.2 percent of potassium.

If, furthermore, this cell is filled with filler gas (at a pressure of about 1 cm. of mercury) for example argon, neon or helium, a slight shift in the optimum temperature of operation towards a higher value is noted. Thus, using an alloy of 2 mg. of rubidium and 25 mg. of potassium, or 92.6 percent of potassium, an operating temperature of 70° C. is obtained instead of 63° C. in the case where the cell contains no buffer gas.

In the case where the cell contains a buffer gas but its walls are not coated with paraffin, a new phenomenon occurs.

The glass of the cell walls reacts strongly with the rubidium and absorbs permanently a certain quantity of atoms. On the other hand, the presence of a buffer gas decelerates the movement of the atoms from the reservoir to the walls.

Accordingly, a dynamic pressure equilibrium state is developed and in order to obtain an appropriate alkaline vapor pressure in the cell it is necessary to raise the latter's temperature or, in order to operate at a temperature of 70° C, to reduce the proportion of potassium in the alloy. In addition, in order to facilitate exchange between liquid and gaseous phases, it is preferable to deposit the alloy not in the bulb 3 but directly in the envelope 1. In this way an optimum temperature of operation of 70° C is obtained with an alloy of 2 mg. of rubidium and 16 mg. of potassium, or 88.9 percent of potassium.

Figure 3:
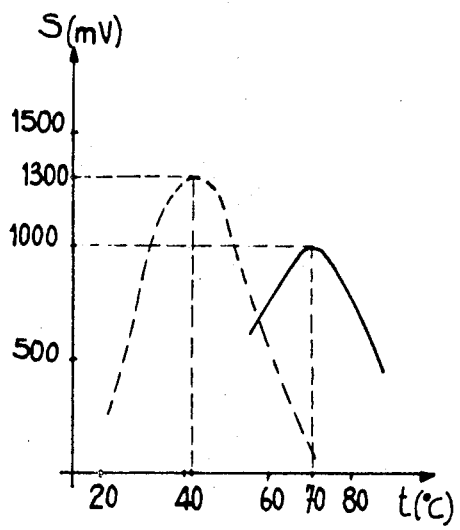
FIG. 3 illustrates variations in the resonance signal as a function of the temperature of the cell.

In FIG. 3, the variations in the resonance signal as a function of the temperature, for a known cell using pure rubidium and a mixture of argon and neon at a pressure of 1 cm. of mercury (dotted graph), and for a cell in accordance with the invention using rubidium as the resonator element and potassium as the alloying metal, and containing also a mixture of argon and neon at a pressure of 1 cm. of mercury (full-line graph), have been plotted.

All the foregoing developments relating to the rubidium vapor cell employed in an atomic clock, apply of course to the case of a cell used in a magnetometer.

However, since, in this latter case, the collision influence the relaxation phenomenon rather little, if is obvious that the conditions cited in relation to the metal chosen for alloying with the alkaline are less stringent, except for the condition relating to the miscibility, if easy temperature control is desired.

Of course, the example described are in no way limitative of the scope of the invention.

We claim:

1. An optical resonance cell containing an alkali metal vapor to be optically pumped, comprising a transparent sealed enclosure and, in said enclosure, an alloy of said alkali with another metal selected for the spin exchange collisions to be substantially negligible between the atoms of the vapor of said other metal and the atoms of said alkali metal vapor 2. A cell as claimed in claim 1, wherein said alloy is disposed in a bulb communicating with said enclosure.

3. A cell as claimed in claim 2, wherein said other metal is a metal having a resultant electron spin equal to zero.

4. A cell as claimed in claim 3, wherein said other metal is mercury.

5. A cell as claimed in claim 2, wherein said other metal is selected for the product of its vapor pressure and its effective cross section of spin exchange collision with respect to the atoms of said alkali metal to be lower than the product of the vapor pressure of said alkali metal and the effective cross section of spin exchange collision of said alkali atoms with respect to one another.

6. A cell as claimed in claim 5, wherein said other metal is gold.

7. A cell as claimed in claim 5, wherein said other metal is selected according to the relationship $$0.93 \leq \frac{r_A}{r_M} \leq 1.07$$

where $r_A$ and $r_M$ are the atomic radii respectively of said alkali atoms and said other metal.

8. A cell as claimed in claim 7, wherein said other metal is another alkali metal.

9. A cell as claimed in claim 8, wherein said alkali metal is rubidium and said other metal is potassium.

10. A cell as claimed in claim 1, wherein said enclosure contains a buffer gas and said alloy is disposed in said enclosure.

11. A cell as claimed in claim 2, wherein said other metal is selected according to the relationship $$0.93 \leq \frac{r_A}{r_M} \leq 1.07$$

where $r_A$ and $r_M$ are the atomic radii respectively of said alkali atoms and said other metal.